United States Patent [19]

Hammelmann

[11] 4,411,634
[45] Oct. 25, 1983

[54] FLEXIBLE COUPLING HAVING MOLDED PLASTIC FLEXIBLE DIAPHRAGMS

[75] Inventor: Robert W. Hammelmann, Minoa, N.Y.

[73] Assignee: The Bendix Corporation, Teterboro, N.J.

[21] Appl. No.: 205,360

[22] Filed: Nov. 10, 1980

[51] Int. Cl.³ .............................................. F16D 3/78
[52] U.S. Cl. ...................................... 464/91; 29/447;
464/85; 464/88; 464/99
[58] Field of Search ............................ 464/85, 88-94,
464/98, 99; 29/447

[56] References Cited

U.S. PATENT DOCUMENTS

| | | | |
|---|---|---|---|
| 3,012,421 | 12/1961 | Cull | 464/89 |
| 3,759,063 | 9/1973 | Bendell | 464/99 |
| 3,800,557 | 4/1974 | Tobin | 464/94 |
| 3,808,837 | 5/1974 | Anderson et al. | 464/99 |
| 3,905,208 | 9/1975 | Oyama et al. | 464/88 |
| 4,044,571 | 8/1977 | Wildhaber | 464/91 |
| 4,092,837 | 6/1978 | Gebauer | 464/85 |
| 4,133,187 | 1/1979 | Wildhaber | 464/91 |
| 4,133,188 | 1/1979 | Cartwright et al. | 464/99 |

Primary Examiner—John Petrakes
Attorney, Agent, or Firm—Anthony F. Cuoco; James R. Ignatowski

[57] ABSTRACT

A flexible coupling having molded plastic flexible diaphragms and a molded composite spacer shaft is disclosed. The flexible diaphragms have an axially formed convoluted bore shrunk fit onto a mating convoluted surface of the spacer shaft. The flexible diaphragms are attached about their periphery to radial flanges of input and output members adapted to be connected to rotatable shafts.

16 Claims, 3 Drawing Figures

FIG. 1
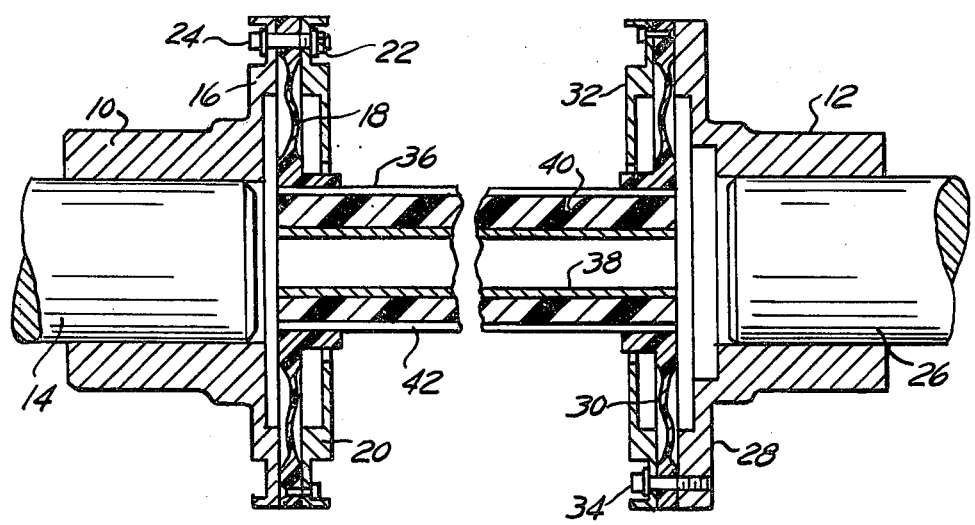
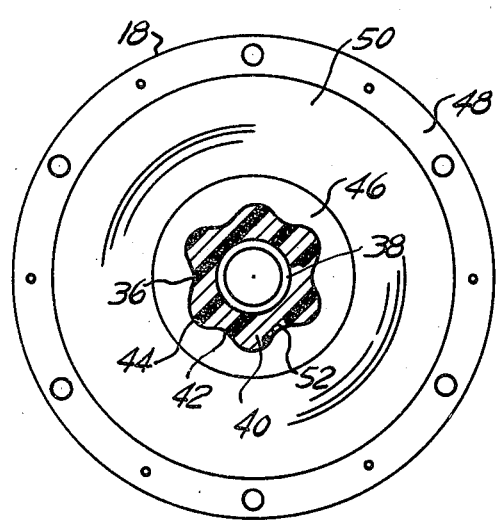
FIG. 2
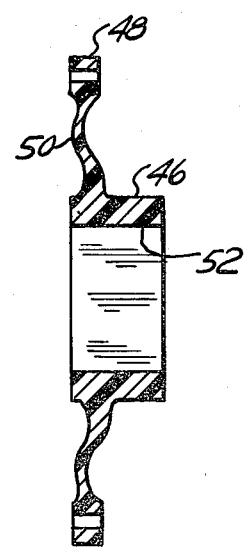
FIG. 3

FLEXIBLE COUPLING HAVING MOLDED PLASTIC FLEXIBLE DIAPHRAGMS

BACKGROUND OF THE INVENTION

1. Field of the Invention

The invention is related to the field of mechanical couplings which connect one rotatable shaft to another, and more particularly to flexible diaprahgm couplings for interconnecting rotating shafts which may become misaligned with respect to each other.

2. Prior Art

Flexible mechanical couplings have found wide acceptance in industry for the transmission of rotary energy from one device to another. Often it is extremely difficult to mount or install two devices, such as a turbine and an electrical generator, or a motor and a pump so that their output and input shafts are in exact alignment. Even where such alignment may be achieved in the first instance, settling of foundations, shifting of supporting members, or even bearing wear may subsequently cause a misalignment between the two shafts. The resulting misalignment may be an angular displacement, a physical displacement along the axes of the rotary shafts, a physical displacement normal to the shift axes, or a combination of two or more of the above.

To compensate for misalignment between the driving and driven members a variety of flexible couplings have been developed. One form of such flexible couplings is the drive shaft used on present day automotive vehicles. These drive shafts have a pair of universal joints connected to the opposite ends of an extentable shaft. Other examples of flexible couplings are disclosed by Cull in U.S. Pat. No. 3,012,421, Tobin in U.S. Pat. No. 3,800,557, Oyama et al in U.S. Pat. No. 3,905,208 and Gebauer et al in U.S. Pat. No. 4,092,837. Cull teaches a rubber insert bonded between a splined or convoluted metal hub and a convoluted exterior. Tobin teaches a universal joint having a laminated rubber coupling. Oyama et al, like Cull teaches a rubber insert bonded between metallic cylindrical members while Gebauer et al teaches rubber isolation members between parallel plates. In addition to couplings having universal joints and rubber inserts, flexible couplings having flexible metal diaphragms interconnected between the driving and driven members have been developed. The flexible diaphragm couplings avoid the maintenance and breakdown problems associated with universal joints and rubber inserts making them more reliable. Further these couplings are capable of transmitting higher torques than is possible with couplings having universal joints or using rubber inserts.

These flexible diaphragm type couplings may include one or more flexible metal diaphragms as disclosed in U.S. Pat. Nos. 4,133,187 and 3,808,837. The flexible diaphragms may be bolted or welded to the interconnecting shaft as is known in the art and may include a splined coupling between the flexible diaphragm and the shaft to assure the transfer rotary motion without slippage or backlash. As disclosed by Wildhaber in U.S. Pat. No. 4,133,187 the central bore of the flexible diaphragm has a female spline which mates with a male spline formed at the end of the interconnecting shaft. Axial movement of the flexible diaphragm along the shaft is inhibited by a pair of retainer ring welded to the splined shaft, one on either side of the flexible diaphragm. Alternatively, Anderson et al in U.S. Pat. No. 3,808,837 disclose a plurality of flexible diaphragms, each having a splined bore mating with the spline on the connecting shaft which are axially entrapped at the end of the interconnecting shaft between a formed shoulder and an end plate bolted to the end of the connecting shaft. Other patents of interest which disclose splined couplings between the flexible metal diaphragms and the interconnect shaft are Cartwright, U.S. Pat. No. 4,133,188, and Weldhaber U.S. Pat. No. 4,044,571.

Bendall in U.S. Pat. No. 3,759,063 teaches a coupling made from metal or equivalent heat resistant material. Bendall's coupling incorporates two laminated flexible assemblies joined to a serrated shaft at a central location. Axial movement of the laminated assemblies at their junction with the serrated shaft is inhibited by retainer rings seated in grooves machined about the shaft's external surface.

Disclosed herein is a flexible diaphragm coupling having molded plastic components. The disclosed coupling has all the advantages of the diaphragm couplings of the prior art, is of simpler construction, and significantly less costly to make.

SUMMARY OF THE INVENTION

The invention is a flexible diaphragm mechanical coupling having molded plastic flexible diaphragms interconnected by a composite molded plastic shaft. The molded plastic shaft has an external convoluted exterior plastic surface molded onto a centrally disposed metal sleeve providing dimensional stability of the convoluted surface. The molded diaphragms have convolted axially disposed bores which are shrunk fit over the convoluted external surface of the shaft providing a structurally strong joint between the mating parts. Both the flexible diaphragms and the composite shafts are molded from a structural plastic such as a polycarbonate plastic material impregnated with fiber glass to increase its structural strength.

The primary object of the invention is a flexible diaphragm mechanical coupling having molded plastic components which is functionally equivalent to the all metal flexible diaphragm coupling of the prior art and significantly less expensive to make. Another object of the invention is a coupling in which the flexible diaphragms are shrunk fit on the interconnecting shaft eliminating the requirement for retainer rings, or other equivalent extra components to join the diaphragm to interconnecting shaft. Another objective is to provide convoluted connection between the diaphragms and the interconnecting shaft for positive transmission of rotational torque. A final objective is a method of fabricating the flexible diaphragm having a complex flexible section which is adaptable to high volume mass production techniques. These and other objects of the invention will be understood from the detailed description of the invention read in conjunction with the referenced figures.

BRIEF DESCRIPTION OF THE DRAWINGS

FIG. 1 is a cross section of the disclosed flexible diaphragm mechanical coupling;

FIG. 2 is a front view of the molded flexible diaphragm; and

FIG. 3 is a cross-sectional view of the flexible diaphragm alone.

DETAILED DESCRIPTION OF THE INVENTION

Referring to FIG. 1, there is shown a completed assembly of a flexible mechanical coupling. The coupling comprises an input member 10 and an output member 12. The input member 10 is adopted to be connected to the shaft 14 of a source of rotary power, such as a turbine, electric motor, or internal combustion engine. The input member 10 has a radially extending flange 16 which is connected about its periphery to a molded plastic flexible diaphragm 18. An annular molded plastic shield 20 may be disposed adjacent to the flexible diahragm 18 on the side opposite the radial flange 16 to protect the flexing portion of the diaphragm 18 from accidental damage. The flexible diaphragm 18 and shield 20 are secured to the radial flange by a series of equally spaced nuts and bolts, 22 and 24, respectively, as shown.

The output member 12 is adapted to be connected to the shaft 26 of a utilization device (not shown) such as an electric generator, pump, or any other such device or machine. The output member 12 also has a radially extending flange 28 connected to a second molded plastic flexible diaphragm 30. An annular protective shield 32 may be disposed adjacent to flexible diaphragm 30 on the side opposite the radial flange 28 providing the same function as shield 20. The flexible diaphragm 30 and shield 32 are fixedly attached to the radial flange 28 by a series of equall spaced bolts 34 received in threaded bores of the radial flange illustrating an alternate way of fastening the diaphragm and shield to the radial flange.

The two flexible diaphragms are interconnected by a molded plastic shaft 36. As more clearly illustrated in FIG. 2, the shaft 36 is a composite structure, in which structural polycarbonate plastic 40, is molded over metal sleeve 38. The sleeve 38 is preferably made from steel. Other structurally strong metals or alloys having a thermal coefficient compatable with the selected pastic material may be used in place of steel for sleeve 38. The molded plastic overlay 40 has a convoluted external surface 42 having a plurality of convolutes 44 equally disposed about its periphery. The sleeve 38 provides dimensional stability to the convoluted surfaces during the molding process and in the assembled coupling.

The flexible diaphragms 18 and 30 are of identical structure, therefore, their details will only be discussed relative to flexible diaphragm 18. It is understood, however, that diaphragms 18 and 30 need not be of the same size and one may be larger or smaller than the other for particular applications. Referring now to FIGS. 2 and 3, each flexible diaphragm comprises a hub 46, a rim 48 and an intermediate flexible section 50 interconnecting the rim 48 with the hub 46. The flexible section 50 preferably has a contoured (S-shaped) configuration which is gradually tapered, having its maximum thickness adjacent to the hub 46 and its minimum thickness adjacent to the rim 48. The rim 48 is substantially thicker than the adjoining portion of the flexible section 50 providing a structurally rigid support about the periphery of the flexible diaphragm and facilitates the attachment of the flexible diaphragm to the radial flange. The increased thickness of the rim 48 also provides uninhibited flexing of the flexible section 50 at its outer extremities.

The hub 46 is substantially wider than the rim 48 and has a convoluted internal bore 52 which corresponds to the convoluted external surface 42 of the shaft 36. The effective diameter of the convoluted internal bore 52 is smaller than the effective diameter of the convoluted external surface 42. The difference between the effective diameter of the convoluted bore 52 and external surface 42 of shaft 36 is an amount determined to produce a Class 8 shrink fit between the two members when joined.

In the assembly of the flexible diaphragms 18 and 30 to the shaft 36, the diaphragms are uniformly heated expanding the effective diameters of their convoluted bores 52 until they equal or exceed the effective diameter of the convoluted surface 42 of the shaft 36. The shaft 36 is then inserted into the convoluted bores and the assembly allowed to slowly cool. As the diaphragms cool the effective diameters of the convoluted bores contract onto the shaft producing a structurally secure shrink fit connection between the shaft and the two flexible diaphragms. Alternatively, as is known in the art, the flexible diaphragms 18 and 30 may be kept at room temperature, or a slightly elevated temperature and the shaft 36 cooled to a temperature sufficient to contract the effective diameter of its convoluted surface 42 to be equal to or smaller than the effective diameters of the convoluted bores 52. The cooled shaft 36 is then inserted into the bores 52 of the diaphragms. The effective diameter of the shaft 36 will then expand as the shaft warms up producing a like shrink fit between the joined parts.

Shrink fitting the flexible diaphragms onto the shaft 36 has been found to produce a joint between the parts, structurally stronger than conventional press fit methods. Shrink fitting avoids the lateral cold flow of the plastic material of which the parts are formed. The cold flow encountered with press fitting displaces some of the material from the vicinity of the joint reducing the compressive and frictional forces holding the parts together.

The flexible diaphragms 18 and 30 are made by conventional molding techniques using a polycarbonate plastic material such as that sold under the trade names "Lexan" manufactured by General Electric Corporation and "Merlon" manufactured by Mobay Chemical Corporation. Preferably the polycarbonate plastic is impregnated with fiber glass to increase its structural strength. The molding process significantly reduces the cost of manufacturing the flexible diaphragms as taught by the prior art. The molding process eliminates the slow and tedious lathe turning operations presently required to make the tapered "S" contoured flexible portion 50 of the diaphragms, which make this type of flexible coupling too expensive for many applications. The molding technique also permits the high volume production of the couplings making it competitive with other types of copulings for high volume applications.

Although the invention has been disclosed using a particular class of plastic materials, and specific configurations for the flexible diaphragm and the mating convoluted surfaces, it is not intended that the invention be limited to the materials disclosed or shapes shown. It is obvious that as new plastic materials are developed or become more readily available having superior characteristics, these may be used in place of the fiber glass impregnated polycarbonate plastic material disclosed herein. Further, alternate configurations of the flexible diaphragm or convoluted shaft may be developed for specific applications without departing from the spirit of the invention.

What is claimed is:

1. A flexible mechanical coupling comprising:
   a first member having an axis of rotation, a flange extending radially from said axis of rotation, and means concentric with said axis of rotation for connection with a rotatable shaft;
   a structural plastic shaft having a convoluted external surface and an internal metal sleeve; and
   a first structural plastic flexible diaphragm interconnecting one end of said shaft to said first member, said flexible diaphragm having a peripheral rim fixedly attached to said radial flange, a hub having a convoluted bore shrunk fit onto the convoluted external surface of said shaft, and a flexible section intermediate said hub and said rim.

2. The flexible coupling of claim 1 wherein said metal sleeve is a cylindrical steel sleeve.

3. The flexible coupling of claim 1 wherein the structural plastic material of which said flexible diaphragm and shaft are made is a polycarbonate plastic.

4. The flexible coupling of claim 1 wherein said structural plastic material is a polycarbonate plastic material impregnated with fiber glass filler.

5. The flexible coupling of claim 1 further including:
   a second member having an axis of rotation, a flange radially extending from said axis of rotation and means concentric with said axis for connection with a rotatable shaft; and
   a second structural plastic flexible diaphragm interconnecting the other end of said shaft with said second member, said flexible diaphragm having a peripheral rim fixedly attached to said second member, a hub having a convoluted bore shrunk fit onto said convoluted external surface of said shaft and a flexible section intermediate said hub and said rim.

6. The flexible coupling of claims 1 or 5 wherein said flexible section has a tapered "S" contoured cross section having its greater thickness adjacent to said hub.

7. The flexible coupling of claim 5 wherein said metal sleeve is a cylindrical steel sleeve.

8. The flexible coupling of claim 5 wherein said flexible diaphragm and shaft are made from a polycarbonate structural plastic.

9. The flexible coupling of claim 5 wherein said flexible diaphragm is made from polycarbonate structural plastic impregnated with fiber glass filler.

10. A method for fabricating a flexible mechanical coupling having a first and second connector member, each connector member having an axis of rotation, a flange at one end radially extending from said axis and a means concentric with said axis at the opposite end for connection with a rotatable shaft, comprising the steps of:
    molding a structural plastic onto a metal sleeve to form a shaft having a convoluted external surface, said convoluted surface having a first effective diameter;
    molding a structural plastic to form a first and a second flexible diaphragm each having an annular rim, a hub having a convoluted bore concentric with said annular rim, and an intermediate flexible section connecting said hub to said rim, said convoluted bore having a second effective diameter smaller than said first effective diameter;
    shrink fitting said first flexible diaphragm onto one end of said molded shaft and said second flexible diaphragm onto the other end of said molded shaft;
    attaching the rim of said first flexible diaphragm to the radial flange of the first connector member and the rim of said second flexible diaphragm to the radial flange of the second coupling member.

11. The method of claim 10 wherein said step of molding a flexible diaphragm includes the step of molding said flexible member having a tapered "S" contoured cross section, said tapered cross section having a first thickness adjacent to said hub and a second thickness thinner than said first thickness adjacent to said rim.

12. The method of claim 10 wherein said steps of molding said shaft and flexible diaphragms includes the steps of:
    molding said shaft with a polycarbonate plastic material; and
    molding said flexible diaphragm with a polycarbonate plastic material.

13. The method of claim 12 wherein said steps of molding is preceded by the step of impregnating said polycarbonate plastic material with a fiber glass filler.

14. The method of claim 10 wherein said step of shrink fitting includes the steps of:
    heating said flexible diaphragms to expand the effective diameter of their convulted bores to be equal to or exceed the effective diameter of the convoluted surface of said shaft;
    inserting one end of the shaft into the expanded convoluted bore of said first flexible diaphragm;
    inserting the other end of the shaft into the expanded convoluted bore of said second flexible diaphragm; and
    cooling the flexible diaphragms to contract the convoluted bores of said diaphragms onto said shaft forming said shrink fit junction between said flexible diaphragms and said shaft.

15. The method of claim 10 wherein said step of shrink fitting includes the steps of:
    cooling said shaft to a temperature sufficient to contract the effective diameter of said convoluted surface to be equal to or less than the effective diameter of the convoluted bores of said flexible dipahragms;
    inserting one end of said cooled shaft into the convoluted bore of said first flexible diaphragm and the other end of said cooled shaft into the convoluted bore of said second flexible diaphragm; and
    slowly returning the temperature of said cooled shaft to the temperature of said flexible diaphragms to expand the effective diameter of the convoluted surface forming said shrink fit junction between said flexible diaphragms and said shaft.

16. The method of claim 10 wherein said step of shrink fitting comprises the steps of:
    heating said flexible dipahragms to a predetermined temperature to expand the effective diameter of their convoluted bores;
    cooling said shaft to a predetermined temperature contracting the effective diameter of the convoluted external surface to be equal to or smaller than the effective diameters of the heated flexible diaphragms;
    inserting one end of the cooled shaft into the bore of the heated first flexible diaphragm and the other end of the cooled shaft into the bore of the heated second flexible diaphragm; and
    allowing said flexible diaphragms and shaft to return to a common temperature causing the convoluted surface of the shaft to expand and the convoluted bores of the flexible diaphragms to contract forming said shrink fit junctions between said flexible diaphragms and said shaft.

* * * * *